United States Patent
Sato et al.

(10) Patent No.: US 7,920,716 B2
(45) Date of Patent: Apr. 5, 2011

(54) VEHICLE SEARCH SYSTEM AND VEHICLE SEARCH METHOD

(75) Inventors: Hiroshi Sato, Oita (JP); Atsuyoshi Ando, Oita (JP); Yutaka Ueyama, Oita (JP); Kunikazu Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 765 days.

(21) Appl. No.: 11/019,545

(22) Filed: Dec. 23, 2004

(65) Prior Publication Data

US 2005/0196016 A1 Sep. 8, 2005

(30) Foreign Application Priority Data

Dec. 25, 2003 (JP) ................. 2003-431115

(51) Int. Cl.
*G06K 9/00* (2006.01)
(52) U.S. Cl. ..................................................... 382/103
(58) Field of Classification Search .................. 382/103, 382/104
See application file for complete search history.

(56) References Cited

U.S. PATENT DOCUMENTS

| 5,734,337 | A | * | 3/1998 | Kupersmit | 340/937 |
| 5,938,717 | A | * | 8/1999 | Dunne et al. | 701/117 |
| 6,285,995 | B1 | * | 9/2001 | Abdel-Mottaleb et al. | 707/3 |
| 6,340,935 | B1 | * | 1/2002 | Hall | 340/932.2 |
| 6,408,301 | B1 | * | 6/2002 | Patton et al. | 707/102 |
| 6,546,119 | B2 | * | 4/2003 | Ciolli et al. | 382/104 |
| 6,629,104 | B1 | * | 9/2003 | Parulski et al. | 707/102 |
| 6,754,369 | B1 | | 6/2004 | Sazawa | 382/105 |
| 6,856,344 | B2 | * | 2/2005 | Franz | 348/143 |
| 7,092,974 | B2 | * | 8/2006 | Thomas et al. | 707/203 |
| 2004/0024758 | A1 | * | 2/2004 | Iwasaki | 707/3 |

FOREIGN PATENT DOCUMENTS

| JP | 11-231993 | 8/1999 |
| JP | 10-131421 | 11/1999 |
| JP | 11-313215 | 11/1999 |
| JP | 2000-242648 | 9/2000 |
| JP | 2000-222673 | 11/2000 |
| JP | 2001-211383 | 3/2001 |
| JP | 2001-273461 | 5/2001 |
| JP | 2003-150635 | 5/2003 |

OTHER PUBLICATIONS

Japanese Office Action issued on Aug. 13, 2009 in corresponding Japanese Patent Application No. 2004-371755.

* cited by examiner

*Primary Examiner* — Tom Y Lu
(74) *Attorney, Agent, or Firm* — Staas & Halsey LLP

(57) ABSTRACT

A vehicle search system is provided, which is capable of easily and efficiently searching for a particular vehicle image based on vague and uncertain information. The vehicle search system includes an image database for accumulating vehicle images photographed by a stationary camera placed on the road under a condition that the vehicle images are associated with at least photographing date and time information and photographing place information of the vehicle image; an image recognizing part for extracting feature information (vehicle color, vehicle shape, etc.) from the vehicle image; an image data managing part for selecting vehicle images from the image database, based on at least one of the photographing date and time information, the photographing place information, and the feature information; and a display processing part for displaying the selected vehicle images in a two-dimensional space or a simulated three-dimensional space on a display, in an arrangement in accordance with similarity of at least one of the photographing date and time information, the photographing place information, and the feature information.

17 Claims, 7 Drawing Sheets

| Vehicle image |
|---|
| Photographing date and time information |
| Photographing place information |
| Vehicle color (first-place) |
| Vehicle color (second-place) |
| Vehicle color (third-place) |
| Vehicle shape (first-place) |
| Vehicle shape (second-place) |
| Vehicle shape (third-place) |
| ⋮ |

FIG. 3

VEHICLE SEARCH SYSTEM AND VEHICLE SEARCH METHOD

BACKGROUND OF THE INVENTION

1. Field of the Invention

The present invention relates to a system for tracking a vehicle using an image of the vehicle photographed by a stationary camera placed on the road. In particular, the present invention relates to a vehicle search system and a vehicle search method capable of efficiently searching for a target vehicle, using vague information on a vehicle such as a vehicle color and the like as a clue, and a computer program product for realizing the vehicle search system and method.

2. Description of the Related Art

Conventionally, a technique of photographing a vehicle running on the road has been proposed. For example, JP2001-211383A discloses an apparatus for photographing a vehicle running on the road, considering environmental light.

A technique of recognizing a vehicle number from a vehicle image has also been proposed conventionally. For example, JP2001-273461A discloses an apparatus for reading and recognizing characters of a number plate with high precision from a vehicle image photographed on the road.

Furthermore, a technique of recognizing features such as a vehicle color, a vehicle type, and the like from a vehicle image, in addition to a vehicle number, has also been proposed. For example, JP2000-222673A discloses an apparatus for extracting a determination area for determining a coating color of a vehicle such as a hood from image data of the vehicle, and determining a color name of the determination area.

However, a particular vehicle can be hardly specified exactly using information on a vehicle to be searched for as a search condition. In most cases, a vehicle type and a vehicle color, as well as a vehicle number can only be expressed in a vague manner such as a "whitish sedan".

Furthermore, even if a vehicle color and a vehicle type of a particular vehicle is given as a search condition, it is not easy to find out a vehicle matched with the search condition from a great amount of photographed and accumulated images. For example, in a camera placed at a point of a lot of traffic, the number of images of passing vehicles may amount to thousands of images. Even if the vehicle images can be classified based on the color as in the apparatus described in the above-mentioned JP2000-222673A, a considerable amount of time is required for displaying images of the corresponding vehicle color one by one (or by several images in such a range as to be displayed on a screen), and visually searching for a particular vehicle. Thus, by the time when an image of the particular vehicle is found out among the images photographed by the stationary camera, it is conceivable that the corresponding vehicle has already moved somewhere, and the direction in which the corresponding vehicle has moved cannot be specified. More specifically, it is conventionally difficult to specify a vehicle by a search based on uncertain information.

SUMMARY OF THE INVENTION

Therefore, with the foregoing in mind, it is an object of the present invention to provide a vehicle search system capable of easily and efficiently searching for a particular vehicle image based on vague and uncertain information.

In order to achieve the above-mentioned object, a vehicle search system according to the present invention includes: an image database for accumulating vehicle images photographed by a stationary camera placed on the road under a condition that the vehicle images are associated with at least photographing date and time information and photographing place information of the vehicle image; an image recognizing part for extracting feature information representing a feature of a vehicle from the vehicle image; an image search part for selecting vehicle images from the image database, based on at least one of the photographing date and time information, the photographing place information, and the feature information; and a display processing part for displaying the vehicle images selected by the image search part in a two-dimensional space or a simulated three-dimensional space on a display, in an arrangement in accordance with similarity of at least one of the photographing date and time information, the photographing place information, and the feature information.

According to the vehicle search system according to the present invention, a number of vehicle images are displayed in a two-dimensional space or a simulated three-dimensional space on a display, in an arrangement in accordance with similarity of at least one of photographing date and time information, photographing place information, and feature information, whereby, even if feature information is vague, it is easy to search for similar vehicle images. According to this configuration, a vehicle search system can be provided, which is capable of easily and efficiently searching for a particular vehicle image based on vague and uncertain information.

These and other advantages of the present invention will become apparent to those skilled in the art upon reading and understanding the following detailed description with reference to the accompanying figures.

BRIEF DESCRIPTION OF TIE DRAWINGS

FIG. 3 is a view illustrating an exemplary data structure of vehicle information in the vehicle search system according to one embodiment of the present invention.

DESCRIPTION OF THE PREFERRED EMBODIMENTS

Figure 1:
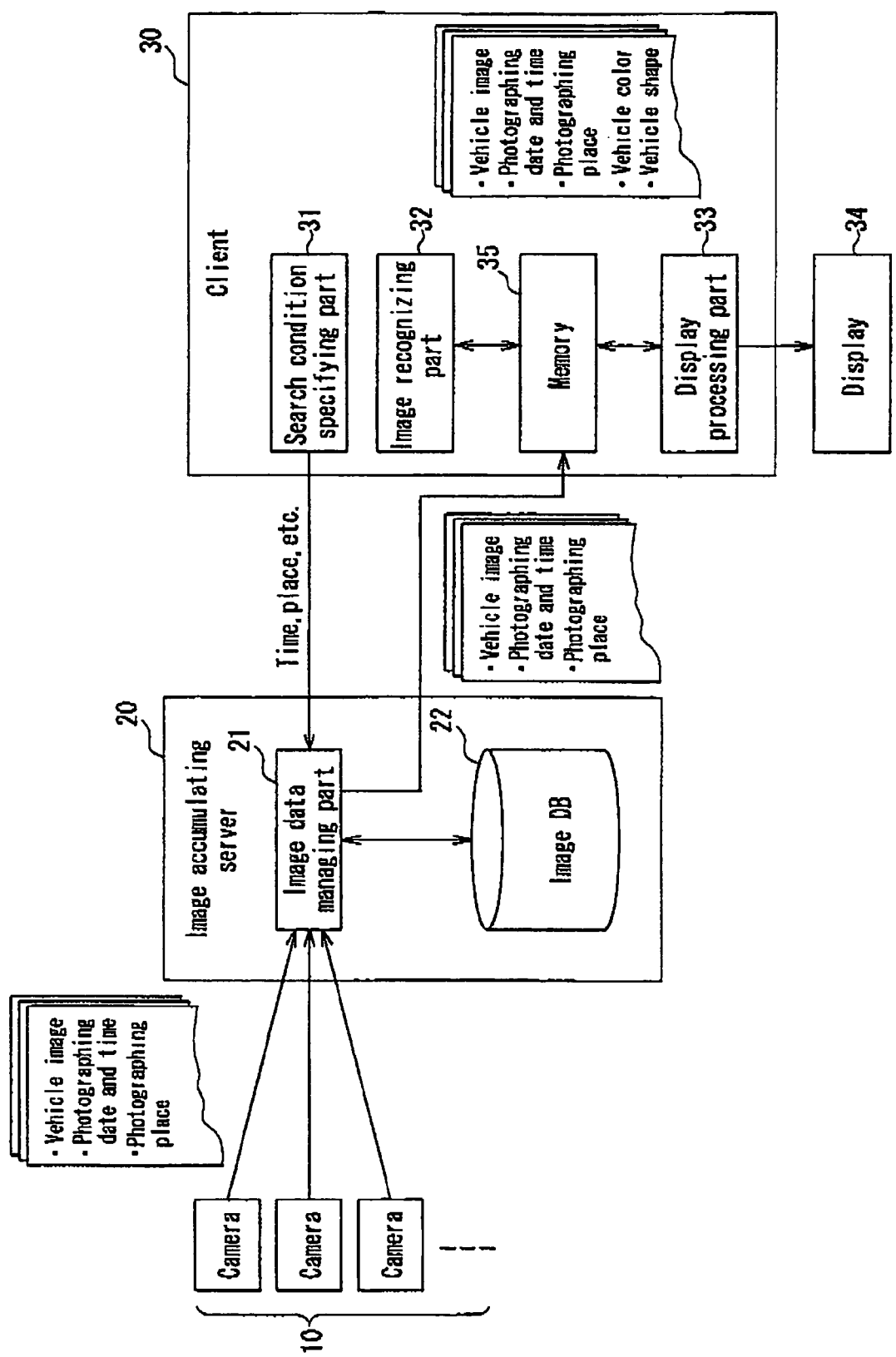
FIG. 1 is a block diagram showing a schematic configuration of a vehicle search system according to one embodiment of the present invention.

A vehicle search system according to the present invention includes: an image database for accumulating vehicle images photographed by a stationary camera placed on the road under a condition that the vehicle images are associated with at least photographing date and tune information and photographing place information of the vehicle image; an image recognizing part for extracting feature information representing a feature of a vehicle from the vehicle image; an image search part for selecting vehicle images from the image database, based on at least one of the photographing date and time information, the photographing place information, and the feature information; and a display processing part or displaying the vehicle images selected by the image search part in a two-dimensional space or a simulated three-dimensional space on a display, in an arrangement in accordance with similarity of at least one of the photographing date and time information, the photographing place information, and the feature information.

In the above-mentioned configuration, it is preferable that, in the case where the display processing part displays the vehicle images in the two-dimensional space or the simulated three-dimensional space, similarity of the vehicle images is determined based on all the photographing date and time information, the photographic place information, and the feature information, and vehicle images similar to each other are arranged close to each other. According to this configuration, similar vehicle images are arranged close to each other on an XY-plane, whereby, even if there are a number of vehicle images, similar images can be efficiently searched for.

Furthermore, in the above-mentioned configuration, it is preferable that the vehicle search system further includes a condition specifying part for allowing a narrowing condition to be input based on at least one of the photographing date and time information, the photographing place information, and the feature information, wherein the display processing part displays only vehicle images matched with the narrowing condition input by the condition specifying part, among the vehicle images displayed in the two-dimensional space or the simulated three-dimensional space. According to this configuration, an operator specifies a condition to narrow the number of vehicle images to be displayed, whereby a search speed can be enhanced.

Furthermore, in the above-mentioned configuration, it is preferable that when either one of the vehicle images displayed in the two-dimensional space or the simulated three-dimensional space is selected, the display processing part rearranges the vehicle images in decreasing order of similarity or in order of time with respect to a standard image and displays them, using the selected vehicle image as the standard image. According to this configuration, it becomes possible to more efficiently search for an intended vehicle image from the vehicle images displayed in the two-dimensional space or the simulated three-dimensional space.

Furthermore, in order to achieve the above-mentioned object, in a computer program product according to the present invention in which a computer program is stored in a storage medium, the computer program allows a computer to execute the following processing of: with respect to an image database for accumulating vehicle images photographed by a stationary camera placed on the road under a condition that the vehicle images are associated with at least photographing date and time information and photographing place information of the vehicle image, making a search request based on at least either one of the photographing date and time information and the photographing place information; receiving vehicle images extracted from the image database in accordance with the search request and storing the vehicle images in a memory; and displaying the vehicle images stored in the memory in a two-dimensional space or a simulated three-dimensional space on a display, in an arrangement in accordance with similarity of at least one of the photographing date and time information, the photographing place information, and feature information representing a feature of a vehicle image.

The program of the computer program product is read by a computer for execution, whereby a particular vehicle image can be easily and efficiently searched for based on vague and uncertain information by the computer.

Furthermore, another aspect of the present invention is directed to a method for searching for a vehicle using an image database for accumulating vehicle images photographed by a stationary camera placed on the road under a condition that the vehicle images are associated with at least photographing date and tune information and photographing place information of the vehicle image. The method includes: photographing a vehicle to be searched for with the stationary camera; extracting feature information representing a feature of the vehicle to be searched for from a photographed image; selecting vehicle images from the image database, based on at least either one of the photographing date and time information, the photographing place information, and the feature information of the vehicle to be searched for; and displaying the selected vehicle images in a two-dimensional space or a simulated three-dimensional space on a display, in an arrangement in accordance with similarity of at least one of the photographing date and time information, the photographing place information, and the feature information.

Hereinafter, the vehicle search system of the present invention will be described by way of specific embodiments with reference to the drawings. In the present embodiment, although an automobile will be illustrated as an example of a vehicle, the "vehicle" according to the present invention is not limited to an automobile, and includes all kinds of vehicles running on the road.

Embodiment 1

FIG. 1 is a block diagram showing a schematic configuration of a vehicle search system according to one embodiment of the present invention.

As shown in FIG. 1, the vehicle search system of the present embodiment is a computer system connected to a plurality of cameras (stationary cameras) 10 placed on the road, which includes an image accumulating server 20 and a client 30. Although not shown in FIG. 1, a communication network is present between the cameras 10 and the image accumulating server 20, and between the image accumulating server 20 and the client 30. This communication network is preferably a dedicated line in terms of security. However, the communication network may be a public network or a wireless network. Furthermore, although FIG. 1 shows only one client 30, a plurality of the clients 30 may be connected to the image accumulating server 20.

The camera 10 is placed on the road, recognizes vehicles every time they pass through a photographing region, and automatically photographs images of the vehicles. The number and setting place of the stationary camera 10 are arbitrary determined. Each vehicle image photographed by the stationary camera 10 is sent to the image accumulating server 20 of the vehicle search system over the above-mentioned communication network together with photographing date and time information and photographing place information. The photographing place information is a code or the like representing the place where each stationary camera 10 is placed.

The image accumulating server 20 includes an image data managing part 21 and an image database 22. The image data managing part 21 manages the storage, search, and read of an image with respect to the image database 22. The image data managing part 21 receives a vehicle image sent from the camera 10, associates the received vehicle image with photographing date and time information and photographing place information thereof, and stores the resultant vehicle image in the image database 22. The image data managing part 21 may perform data compression processing or the like of the vehicle image, if required, before accumulating it in the image database 22.

The client 30 can be implemented, for example, by a personal computer or the like, and is placed at a main center of a vehicle searcher (e.g., a security company) or the like, for example. The client 30 includes a search condition specifying part 31, an image recognizing part 32, and a display processing part 33. The client 30 is connected to peripheral equipment such as a display 34 and a printer (not shown).

The search condition specifying part 31 sends a search condition input by an operator using an input device (not shown) such as a keyboard, a mouse, or the like to the image accumulating server 20. In the vehicle search system of the present embodiment, for example, in the case where a particular vehicle is searched for, the operator presumes, for example, a setting place of the camera 10 that may be photographing a vehicle to be searched for and a time zone in which the vehicle to be searched for is presumed to be photographed, from a point where the vehicle to be searched for was present at a commencement of a search, a direction in which the vehicle to be searched for has been moved, and the like, and only needs to input the presumed setting place and time zone as a search condition. The setting place and the time zone may be both used as a search condition, or either one of them may be used as a search condition.

Upon receiving the search condition from the search condition specifying part 31, the image data managing part 21 of the image accumulating server 20 searches the image database 22 based on the given search condition. At this time, the image data managing part 21 compares the photographing date and time information and the photographing place information stored so as to be associated with the vehicle image in the image database 22, with the information given as the search condition, thereby extracting vehicle images matched with the given search condition. The extracted vehicle images are sent to the client 30 by the image data managing part 21. At this time, the photographing date and time information and the photographing place information associated with the extracted vehicle images are also sent to the client 30 together with the vehicle images.

The client 30 receives the extracted vehicle images from the image database 22 as described above, and stores the received vehicle images, and the photographing date and time information and the photographing place information corresponding to the received vehicle images in a memory 35. The image recognizing part 32 takes out the vehicle images one by one from the memory 35, and extracts feature information from each of the vehicle images. As the feature information, features of an image (e.g., an HSI histogram feature value, etc.), a vehicle color, a vehicle shape, and the like are used.

For example, a method for recognizing a vehicle color from a vehicle image will be described with reference to FIGS. 2A and 2B. This method is merely one example of recognizing a vehicle color as feature information from a vehicle image, and the present invention is not limited to this specific example. Regarding the method for recognizing a vehicle color, there are various known techniques including the method described in the above-mentioned JP2000-222673A, and any of these methods can be applied to the present invention.

Figure 2A:
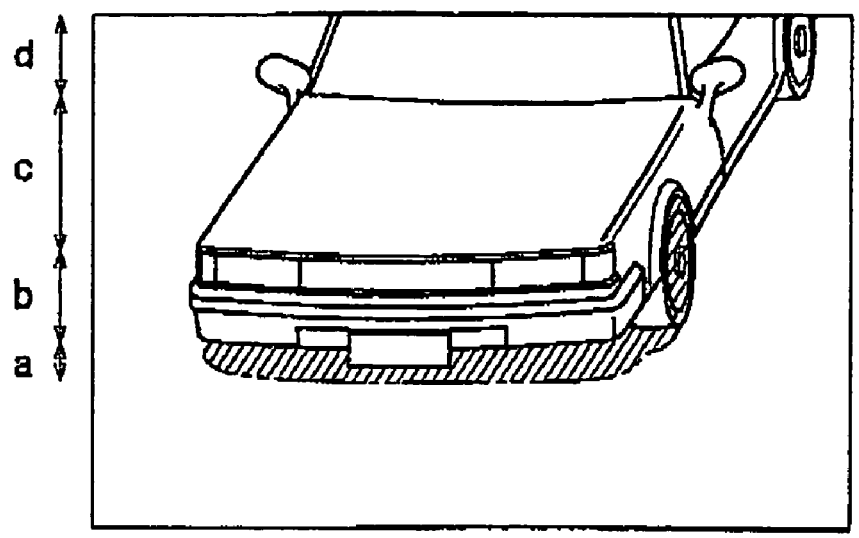
FIG. 2A is a view illustrating an example of a vehicle image in a vehicle search system according to one embodiment of the present invention.
Figure 2B:
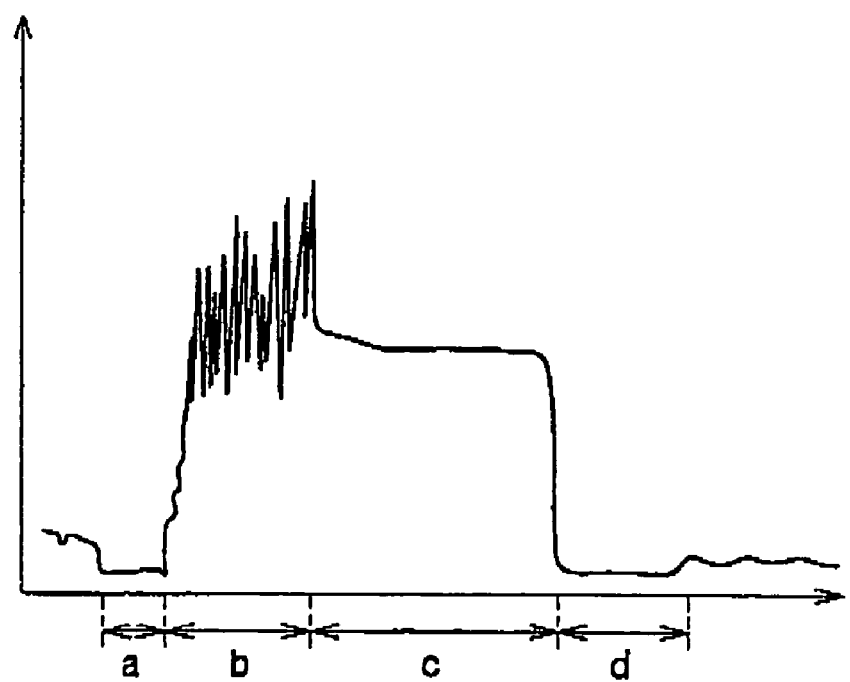
FIG. 2B is a graph showing a luminance variance in a vertical direction of the vehicle image shown in FIG. 2A.

FIG. 2A shows an exemplary vehicle image photographed from a diagonally upper front side by the camera 10. Luminance signals of pixels are scanned in a vertical direction of the vehicle image, a luminance variance as shown in FIG. 2B is obtained. As is understood from the comparison between FIGS. 2A and 2B, in a region "a" in FIG. 2A, there is a shadow of the vehicle on the ground at a front end portion of the vehicle, so that the region "a" in FIG. 2A has a small luminance of pixels as represented in a range of "a" in FIG. 2B. Furthermore, a region "b" in FIG. 2A corresponds to a grille portion on a front surface of the vehicle, and has a number of uneven structures, so that the luminance of pixels is varied remarkably as represented in a range of "b" in FIG. 2B. A region "c" in FIG. 2A corresponds to a hood portion, and has a substantially constant luminance as represented in a range of "a" in FIG. 2B. Furthermore, a region "d" in FIG. 2A corresponds to a windshield portion, which is captured in black when photographed by the camera 10, so that the region "d" has a small luminance as represented in a range of "d" in FIG. 2B. Thus, a vehicle color can be recognized based on a luminance level of the region "c" where a luminance is substantially constant. In the present embodiment, the vehicle color is determined to be one of seven colors of white, black, silver, red, yellow, blue, green, and the like. The kind and number of a vehicle color that can be determined is not limited to this specific example, and arbitrarily set.

In the vehicle search system of the present embodiment, the image recognizing part 32 determines candidates of a vehicle color up to a third-place. This is because a vehicle may be photographed in a color different from the original color due to the light condition and the like. Consequently, an image of a silver vehicle is recognized to be, for example, silver as a first-place, white as a second-place, and black as a third-place.

The image recognizing part 32 may extract a vehicle shape and the like in addition to a vehicle color, as feature information. The vehicle shape can be determined, for example, based on the size of an area occupied by a vehicle body in a vehicle image. Regarding the vehicle shape, a plurality of candidates may be obtained in the same way as in the vehicle color.

The image recognizing part 32 associates the feature information extracted as described above with the vehicle image and stores it in the memory 35. FIG. 3 shows an exemplary configuration of information (vehicle information) stored in the memory 35.

As shown in FIG. 3, the vehicle information includes, as its meta data, photographing date and time information, photographing place information, a vehicle color (first-place), a vehicle color (second-place), a vehicle color (third-place), a vehicle shape (first-place), a vehicle shape (second-place), a vehicle shape (third-place), and the like. Although not shown, if it is possible to recognize a vehicle number from a number plate by the camera 10 or the image recognizing part 32, vehicle number information may be further included as meta data.

Figure 4:
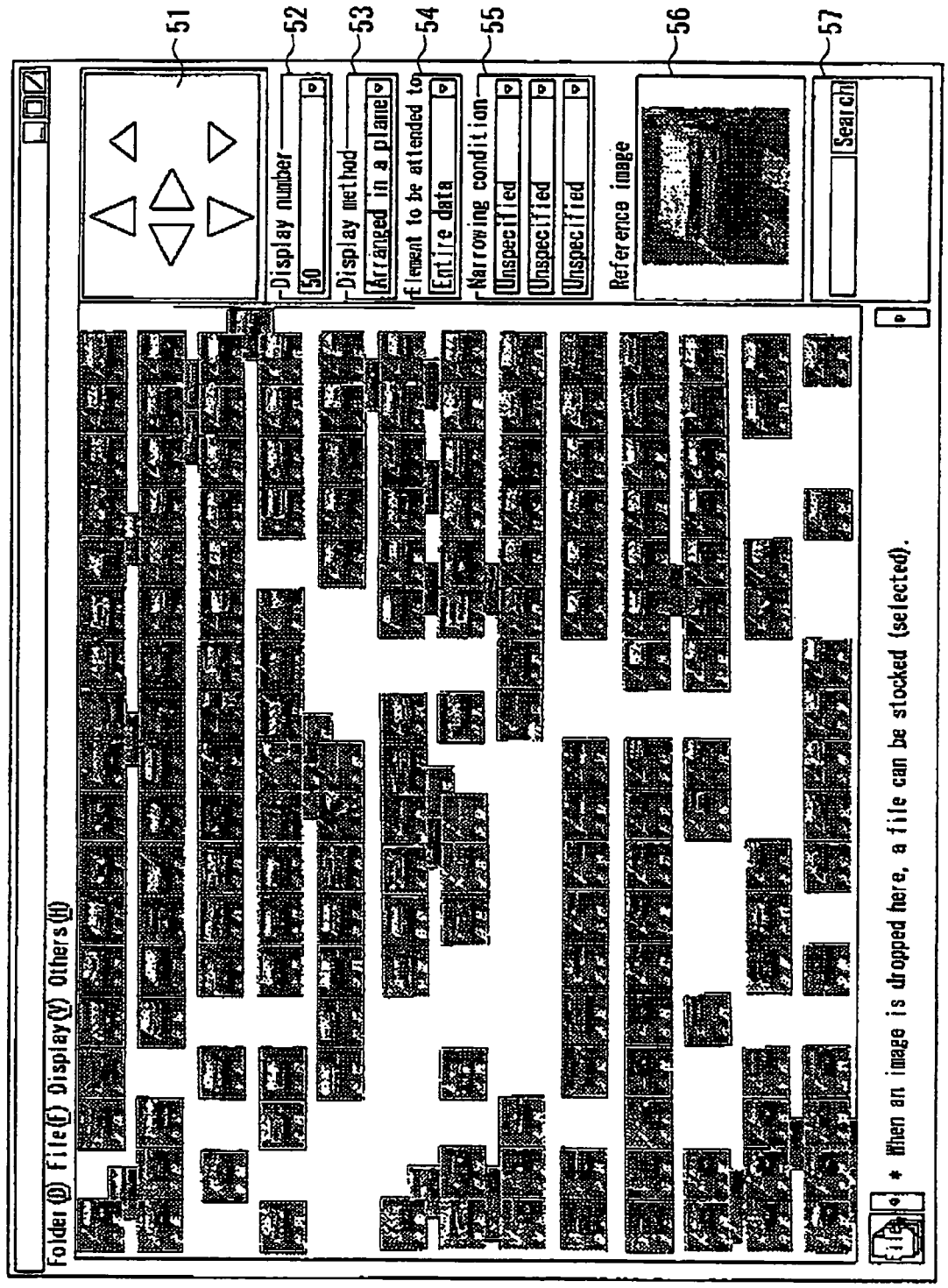
FIG. 4 is a view illustrating an exemplary two-dimensional space display in the vehicle search system according to one embodiment of the present invention.

When the image recognizing part 32 has extracted feature information regarding all the vehicle images in the memory 35 and stored it in the memory 35, the display processing part 33 arranges all the vehicle images stored in the memory 35 in a two-dimensional space (XY-plane), for example, in an embodiment as shown in FIG. 4, and displays them on the display 34. At this time, the display processing part 33 determines a display position of each vehicle image so that similar vehicle images are arranged close to each other on the XY-plane. By displaying the similar vehicle images so that they are arranged close to each other, it becomes easy to find out a vehicle image matched with feature information. The operator can specify which item of vehicle information is used for determining the similarity of vehicle images as described below.

Furthermore, in the case where an operator finds out a vehicle image considered to be matched with feature information on the display screen, the operator clicks the vehicle image thereof, thereby displaying the clicked vehicle image in an enlarged size in a reference image window 56 (described later). Furthermore, a vehicle image similar to the vehicle image displayed in the reference image window 56 can also be displayed in a simulated three-dimensional space in a more easy-to-understand state (described later in detail).

As shown in FIG. 4, on the right side of the display screen, a scroll key 51 for scrolling a display image, a number specifying section 52 for allowing the operator to specify the number of vehicle images desired to be displayed, a display method specifying section 53 for allowing the operator to specify a display method, an attention element section 54 for allowing the operator to specify elements of feature information to be attended to, a narrowing condition section 55 for allowing the operator to specify a narrowing condition, the reference image window 56 in which a reference image is displayed, a search window 57 for performing a search by inputting a search keyword, and the like are displayed.

For example, when the operator operates the scroll key 51, the display processing part 33 scrolls the display screen in vertical and horizontal directions, and enlarges/reduces the display screen. Furthermore, when the operator inputs a number in the number specifying section 52, the display processing part 33 increases/decreases the number of vehicle images to be displayed on one screen. Furthermore, in the display method specifying section 53, "arrangement in a plane", "decreasing order of similarity", "order of time", or the like can be selected. The display example in FIG. 4 corresponds to the case where the "arrangement in a plane" is selected. Display examples in the case where the "decreasing order of similarity" and "order of time" are selected will be described later.

The attention element section 54 allows the operator to select which item of the vehicle information as shown in FIG. 3 is used to perform ordering in arrangement. For example, "entire data", "only an image", "vehicle color", "vehicle shape", "vehicle color and shape", or the like can be selected. When the "entire data" is selected, the display processing part 33 determines the similarity of vehicle images based on all the items of vehicle information shown in FIG. 3, and determines the arrangement order on the display screen. When the "only an image" is selected, similarity is determined based on the information on the vehicle image (e.g., an HSI histogram feature value, etc.). In the case where the "vehicle color" or the "vehicle shape", or the "vehicle color and shape" is selected, the similarity of vehicle images is determined in accordance with these items in vehicle information.

Furthermore, the operator can specify a condition based on the vehicle color or the vehicle shape in the narrowing condition section 55. When the condition is specified in this section, the display processing part 33 extracts only vehicle images matched with the specified condition from the memory 35, and displays them on the display 34. In the narrowing condition section 55, a plurality of conditions can be specified, and it can also be specified whether these conditions are set to be "AND conditions" or "OR conditions".

Furthermore, as described above, in the vehicle search system of the present embodiment, when the image recognizing part 32 recognizes a vehicle color from a vehicle image, candidate colors from a first-place to a third-place are determined. For example, in the case where a vehicle color is known to be white, the condition "vehicle color (first-place) =white" may be set. On the other hand, for example, in the case where feature information given as a search condition is vague as in a "whitish car", by specifying the condition "vehicle color (first-place=white)" and the condition "vehicle color (second-place)=white) as the OR condition, a search for vague feature information can be performed. Furthermore, in the case where both a vehicle color and a vehicle shape are known, for example, two conditions "vehicle color (first-place)=white" and "vehicle shape=sedan" may be specified as the AND condition. Thus, by narrowing in accordance with feature information, unnecessary vehicle images can be excluded, which leads to the enhancement of a search speed.

In the reference image window 56, a vehicle image pointed by the operator with a cursor is displayed in an enlarged size. In the search window 57, a text search is possible regarding information other than a vehicle image included in vehicle information. For example, in the case where a vehicle number is also stored as vehicle information, and a vehicle number of a vehicle to be searched for is known, a search can be performed using a vehicle number as a search key. Furthermore, a search can also be performed using photographing place information, a vehicle color, or a vehicle shape as a search key.

Furthermore, on the lower left portion of the screen shown in FIG. 4, an icon of a file is displayed. The operator can collectively save only the vehicle images to be attended to by dragging and dropping the vehicle images to be attended to onto this icon.

Figure 5:
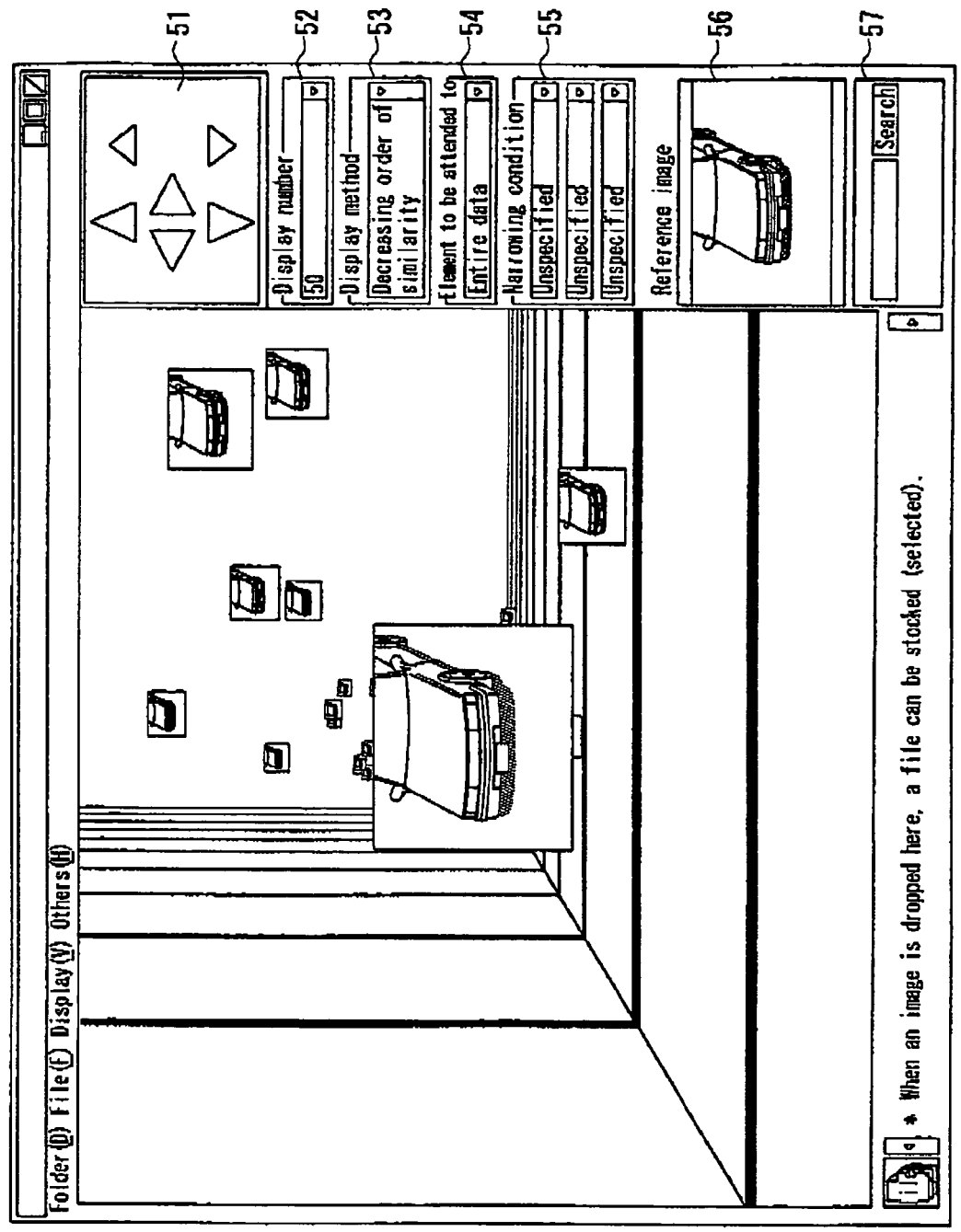
FIG. 5 is a view illustrating an exemplary simulated three-dimensional space display in the vehicle search system according to one embodiment of the present invention.

Hereinafter, a display example in the case where the "decreasing order of similarity" or "order of time" is selected in the display method specifying section 53 will be described. When the operator selects the "decreasing order of similarity" in the display method specifying section 53 after clicking either one of the vehicle images on the two-dimensional space display screen shown in FIG. 4, the display processing part 33 switches the screen on the display 34 to the simulated three-dimensional space display as shown in FIG. 5. In the simulated three-dimensional space, the display surface of the display 34 is an XY-plane, and the depth direction is a Z-axis direction. Then, the display processing part 33 displays the previously clicked vehicle image in the reference image window 56 as a reference image (standard image), and displays it in a most frontward portion on the Z-axis in the simulated three-dimensional space. Furthermore, other vehicle images are arranged so that those having higher similarity to the standard image are placed forward on the Z-axis to be displayed. The coordinate on the Z-axis is expressed based on the size of an image by a perspective.

Furthermore, if a vehicle image different from the standard image (i.e., a vehicle image displayed in a most backward portion) is dragged and dropped onto the reference image window 56 in the simulated three-dimensional space display screen, the display processing part 33 rearranges other vehicle images in decreasing order of similarity to a new standard image, using the vehicle image dropped onto the reference window 56 as the new standard image, and re-displays them.

Thus, by displaying a standard image in a most forward portion, and arranging and displaying vehicle images in a depth direction so that those which have higher similarity to the standard image are placed in a more forward portion, for example, if a vehicle image considered to be close to a vehicle to be searched for is selected as a standard image, the vehicle images similar to the standard image are displayed closer to the front. Because of this, even if the vehicle selected as a standard image is not matched with a vehicle to be searched for, there is a high possibility that an image of the vehicle to be searched for may be displayed close to the selected standard image, so that a search efficiency of a vehicle can be enhanced.

Furthermore, when the "order of time" is selected in the display method specifying section 53, the display processing part 33 arranges and displays vehicle images on the Z-axis in the simulated three-dimensional space in order of photographed time, in accordance with the photographing date and time information included in vehicle information.

By specifying a condition regarding a vehicle color or a vehicle shape in the narrowing condition section 55 as described above, vehicle images to be displayed can be narrowed even from the state of the simulated three-dimensional space display.

It is also preferable that, when the operator left-clicks either one of the vehicle images displayed in the simulated three-dimensional space, the display processing part 33 moves the clicked vehicle image to a most forward surface on the Z-axis and displays it in an enlarged size, and arranges and displays meta data (photographing date and time, photographing place, vehicle color, vehicle shape, vehicle number, etc.) of the vehicle image, next to the vehicle image, for example, as in a pop-up window. Thus, by displaying an image to be attended to in an enlarged size, for example, in the case where a vehicle having caused a traffic accident is set to be the one to be searched for, the abnormality such as a dent of a vehicle body, a breakage of a windshield, and the like can be found easily, which has an effect of specifying a suspicious car rapidly. Furthermore, by arranging and displaying meta data, the operator can compare a vehicle image with meta data to search for a particular vehicle.

As described above, in the vehicle search system according to the present embodiment, vehicle images photographed by the camera 10 are accumulated in the image accumulating server 20. When photographing date and time information or photographing place information is input from the client 30 as a search condition, vehicle images matched with the search condition are extracted and sent to the client 30. Furthermore, in the client 30, the similarity of vehicle images is determined based on the similarity of vehicle images themselves, and feature information such as a vehicle color, a vehicle shape, etc. Vehicle images are displayed in a two-dimensional space or a simulated three-dimensional space in accordance with the determined similarity. Because of this, in the vehicle search system according to the present embodiment, a search for a vehicle image based on vague feature information can performed efficiently.

Figure 6:
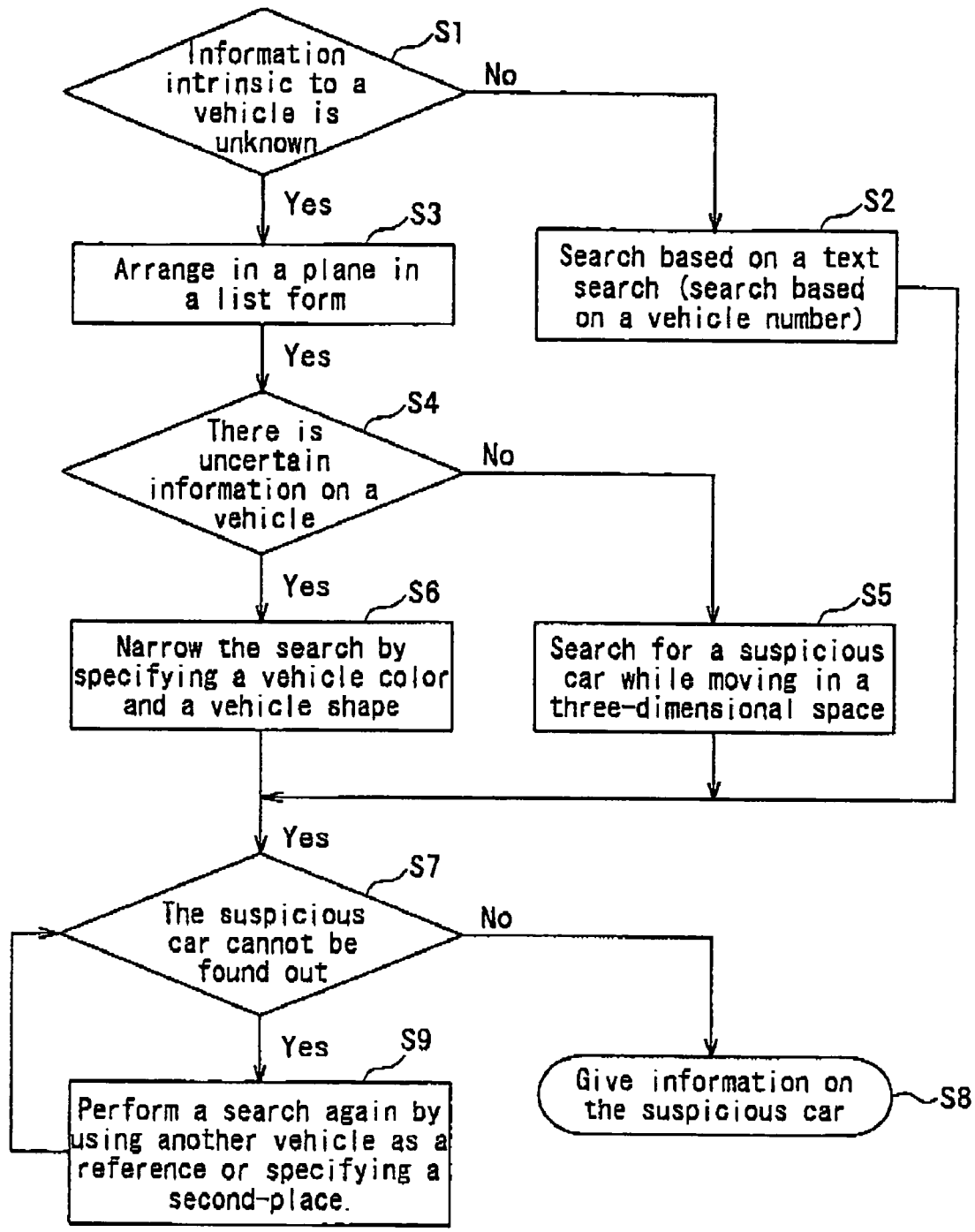
FIG. 6 is a flow chart showing a procedure of a vehicle search method using the vehicle search system according to one embodiment of the present invention.

Herein, the procedure of a method for searching, for example, a vehicle having caused an accident, using the vehicle search system according to the present embodiment will be described with reference to FIG. 6.

First, in the case where intrinsic information (e.g., a vehicle number) to a vehicle to be searched for is known from feature information and the like (No in Operation 1), the vehicle number is input in the search window 57, whereby whether or not a vehicle image of the vehicle is accumulated in a system is determined (Operation 2).

In the case where intrinsic information to a vehicle to be searched for is unknown (Yes in Operation 1), a place or time is specified by the search condition specifying part 31 of the cheat 30, whereby the corresponding vehicle images are extracted from the image database 22, and displayed in a two-dimensional space on the display 34 (Operation 3).

Furthermore, in the case where there is no feature information (uncertain information) regarding a color or a shape of the vehicle to be searched for (No in Operation 4), for example, a display method is set to be an order of time, or the like in the simulated three-dimensional space display, whereby a suspicious car that has a dent in a body or a breakage of a windshield, for example, is visually searched for by the operator (Operation 5).

On the other hand, in the case where there is feature information (uncertain information) regarding a color or a shape of the vehicle to be searched for (Yes in Operation 4), these pieces of information are input in the narrowing condition section 55, whereby vehicles whose color and shape are matched with feature information are narrowed to be displayed, and a suspicious car is visually searched for among them by the operator (Operation 7).

In the case where an image of a suspicious car can be found out as a result of Operations 2, 5, or 7, the main center notifies each department of information required for holding the corresponding vehicle, based on meta data (photographing date and time, photographing place, vehicle color, vehicle shape, vehicle number, etc.) of the suspicious car (Operation 8). The client 30 may also give information on the unsuspicious car in Operation 8. In this case, the client 30 only needs to send a text message or the like including the vehicle image and meta data to a computer mounted on a traveling security vehicle, etc., a mobile telephone of a worker, or the like.

Embodiment 2

Another embodiment of the present invention will be described below.

Figure 7:
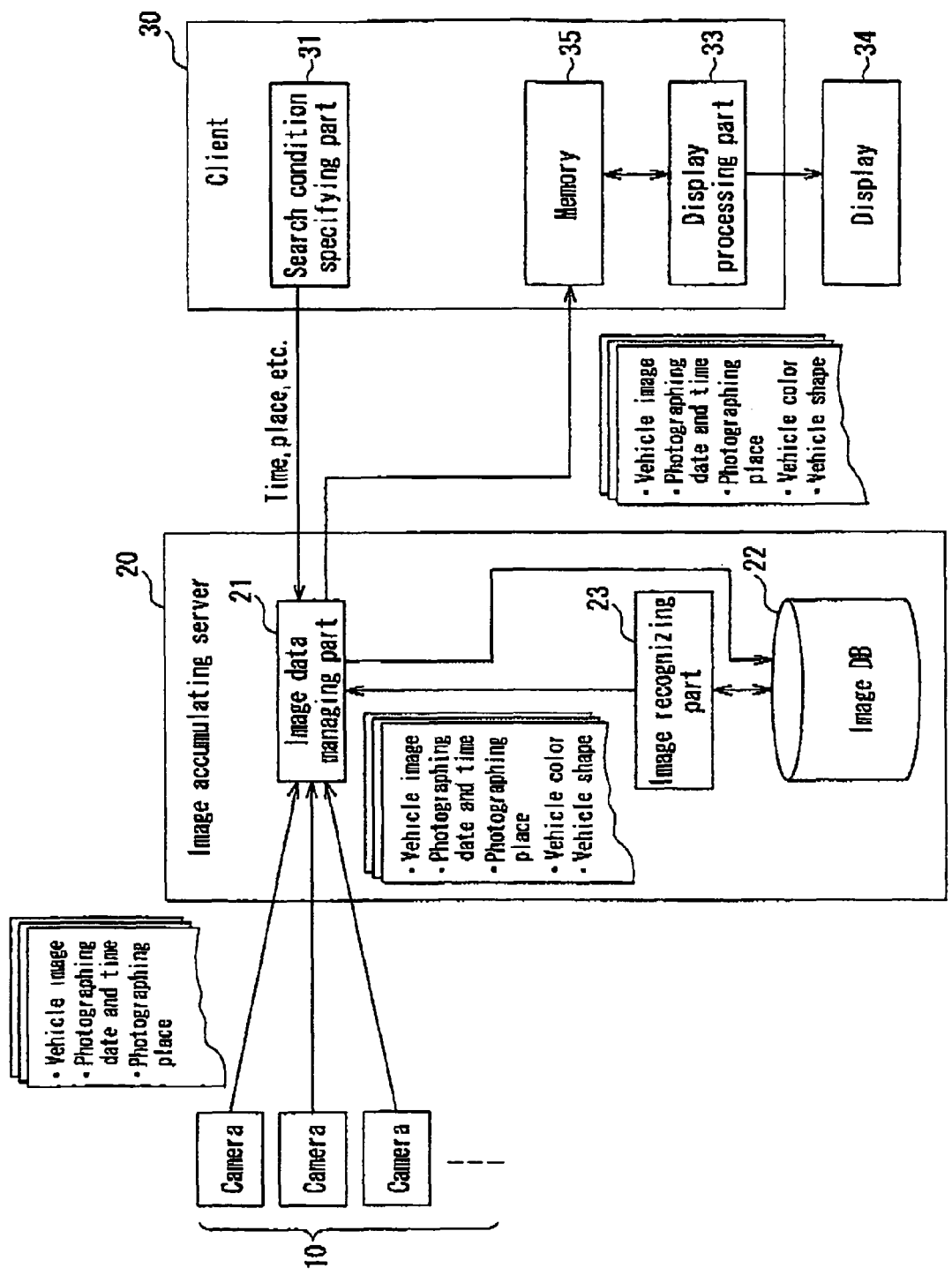
FIG. 7 is a block diagram showing a schematic configuration of a vehicle search system according to another embodiment of the present invention.

In the vehicle search system according to Embodiment 1, feature information is extracted from a vehicle image in the image recognizing part 32 of the client 30. In contrast, in the vehicle search system according to Embodiment 2, feature information is extracted from a vehicle image in the image accumulating server 20. Therefore, the vehicle search system according to the present embodiment includes an image recognizing part 23 in the image accumulating server 20, and there is no image recognizing part in the client 30 as shown in FIG. 7.

In the vehicle search system of the present embodiment, before a vehicle image sent from the camera 10 is registered in the image database 22, the image accumulating server 20 extracts feature information (vehicle color, vehicle shape, etc.) from the vehicle image by the image recognizing part 23. Then, the feature information extracted from the image recognizing part 23, as well as the photographing date and time, and the photographing place received from the camera 10 are registered in the image database 22 as meta data of the vehicle image.

When a search condition such as photographing date and time, a photographic place, and the like are given from the search condition specifying part 31 of the client 30, the image data managing part 21 extracts vehicle images matched with the search condition from the image database 22, and sends them to the client 30. At this time, the search condition specifying part 31 may give a search condition regarding meta data (feature information such as a vehicle color, a vehicle shape, etc.) other than photographing date and time, a photographing place, and the like.

The client 30 stores the vehicle information sent from the image data managing part 21 in the memory 35. Thereafter, the display processing part 33 displays vehicle images in a two-dimensional space or a simulated three-dimensional space in accordance with the instruction of the operator, based on the vehicle information stored in the memory 35. The display processing is similar to that in Embodiment 1, so that the detailed description thereof will be omitted here.

As described above, even in the vehicle search system according to the present embodiment, a search for a vehicle image based on vague feature information can be performed efficiently in the same way as in Embodiment 1.

Each of the above-mentioned embodiments does not limit the present invention, and the present invention may be modified variously within a technical scope of the present invention. In particular, the relationship between various kinds of functional blocks shown in FIGS. 1 and 7 and hardware is merely an example, and does not limit the present invention. For example, in each of the above-mentioned embodiments, the configuration in which the display processing part is present in the client has been illustrated. However, the display processing part may be provided in the image accumulating server 20. Furthermore, feature information (vehicle color, vehicle shape, etc.) may also be extracted from a vehicle image with the camera 10. Furthermore, the embodiments of the two-dimensional space display shown in FIG. 3 and the simulated three-dimensional space display shown in FIG. 5 are merely specific examples, and an arbitrary layout can be adopted.

As described above, the present invention is useful as a vehicle search system capable of searching for a vehicle based on uncertain feature information.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A vehicle search system including a server and a client, comprising:
    an image database accumulating vehicle images photographed by a stationary camera placed on the road under a condition that the vehicle images are associated with at least photographing date and time information and photographing place information of the vehicle image;
    an image recognizing part for extracting feature information representing a feature of a vehicle from the vehicle image;
    an image search part for selecting vehicle images from the image database, based on at least one of the photographing date and time information, the photographing place information, and the feature information, and;
    a display processing part for determining similarity of the vehicle images selected by the image search part based on at least one of the photographing date and time information, the photographing place information, and the feature information, and displaying a standard image selected from the vehicle images at the most forward portion in a simulated three-dimensional space on a display and other vehicle images so that those which have higher similarity to the standard image are placed in a more forward portion by using perspective.

2. A vehicle search system, comprising:
    an image database for accumulating vehicle images photographed by a stationary camera placed on the road under a condition that the vehicle images are associated with at least photographing date and time information and photographing place information of the vehicle image;
    an image recognizing part for extracting feature information representing a feature of a vehicle from the vehicle image;
    a display processing part for displaying the vehicle images received by the image search part in a two-dimensional space or a simulated three-dimensional space on a display, in an arrangement in accordance with similarity of at least one of the photographing date and time information, the photographing place information, and the feature information, wherein
    the display processing part determines similarity of the vehicle images based on all the photographing date and time information, the photographic place information, and the feature information, and displays a standard image selected from the vehicle images in a simulated three-dimensional space so that other vehicle images which have higher similarity to the standard image are placed in a more forward portion by using perspective.

3. The vehicle search system according to claim 2, further comprising a condition specifying part for allowing a narrowing condition to be input based on at least one of the photographing date and time information, the photographing place information, and the feature information,
    wherein the display processing part displays only vehicle images matched with the narrowing condition input by the condition specifying part, among the vehicle images displayed in the simulated three-dimensional space.

4. The vehicle search system according to claim 2, wherein, when either one of the vehicle images displayed in the simulated three-dimensional space is selected, the display processing part rearranges the vehicle images in decreasing order of similarity or in order of time with respect to a standard image and displays them, using the selected vehicle image as the standard image.

5. The vehicle search system according to claim 1, wherein the feature information includes at least one selected from a vehicle color and a vehicle shape.

6. A computer program product in which a computer program is stored in a storage medium, the computer program being executed by a client and allowing a client computer to execute the following processing of:
    with respect to an image database accumulating a vehicle image photographed by a stationary camera placed on the road under a condition that the vehicle image is associated with at least photographing date and time information and photographing place information of the vehicle image, making a search request from the client to the server based on at least either one of the photographing date and time information and the photographing place information;
    receiving vehicle images extracted from the image database in accordance with the search request and storing the vehicle images in a memory; and
    determining similarity of the vehicle images stored in the memory based on at least one of the photographing date and time information, the photographing place information, and feature information representing a feature of a vehicle image, and displaying a standard image selected from the vehicle images in a simulated three-dimensional space so that other vehicle images similar to each other are arranged close to each other and those which have higher similarity to the standard image are placed in a more forward portion by using perspective.

7. A computer program product in which a computer program is stored in a storage medium, the computer program being executed by a client and allowing a client computer to execute the following processing of:
    with respect to an image database accumulating a vehicle image photographed by a stationary camera placed on the road under a condition that the vehicle image is associated with at least photographing date and time information and photographing place information of the vehicle image, making a search request from the client to the server based on at least either one of the photographing date and time information and the photographing place information;

receiving vehicle images extracted from the image database in accordance with the search request and storing the vehicle images in a memory; and displaying the vehicle images stored in the memory in a simulated three-dimensional space on a display, in an arrangement in accordance with similarity of at least one of the photographing date and time information, the photographing place information, and feature information representing a feature of a vehicle image, wherein the computer program allows the computer to execute processing of, in a case where the vehicle images are displayed in the simulated three-dimensional space, determining similarity of the vehicle images based on all the photographing date and time information, the photographing place information, and the feature information, and arranging similar vehicle images close to each other and displaying a standard image selected from the vehicle images in the simulated three-dimensional space so that other vehicle images similar to each other are arranged close to each other and those which have higher similarity to the standard image are placed in a more forward portion by using perspective.

8. The computer program product according to claim 7, wherein the computer program further allows the computer to execute the following processing of:

inputting a narrowing condition regarding at least one of the photographing date and time information, the photographing place information, and the feature information; and re-displaying only a vehicle image matched with the narrowing condition input by the condition specifying part among vehicle images displayed in the simulated three-dimensional space.

9. The computer program product according to claim 7, wherein the computer program further allows the computer to execute the following processing of:

receiving selection with respect to either one of the vehicle images displayed in the simulated three-dimensional space; and rearranging the vehicle images in decreasing order of similarity or in order of time with respect to a standard image, using the selected vehicle image as the standard image.

10. The computer program product according to claim 6, wherein the feature information includes at least one selected from a vehicle color and a vehicle shape.

11. A vehicle search method for searching for vehicle images using an image database for accumulating vehicle images photographed by a stationary camera placed on the road under a condition that the vehicle images are associated with at least photographing date and time information and photographing place information of the vehicle image, the method comprising:

photographing a vehicle to be searched for with the stationary camera;

extracting feature information representing a feature of the vehicle to be searched for from a photographed image;

selecting, by a server, vehicle images from the image database, based on at least either one of the photographing date and time information, the photographing place information, and the feature information of the vehicle to be searched for; and determining, in a client, similarity of the selected vehicle images based on at least one of the photographing date and time information, the photographing place information, and the feature information, and displaying the vehicle images in a simulated three-dimensional space on a display so that vehicle images similar to each other are arranged close to each other and displaying a standard image selected from the vehicle images in the simulated three-dimensional space so that other vehicle images similar to each other are arranged close to each other and those which have higher similarity to the standard image are placed in a more forward portion by using perspective.

12. A vehicle search method for searching for vehicle images using an image database for accumulating vehicle images photographed by a stationary camera placed on the road under a condition that the vehicle images are associated with at least photographing date and time information and photographing place information of the vehicle image, the method comprising:

photographing a vehicle to be searched for with the stationary camera;

extracting feature information representing a feature of the vehicle to be searched for from a photographed image;

selecting, by a server, vehicle images from the image database, based on at least either one of the photographing date and time information, the photographing place information, and the feature information of the vehicle to be searched for; and displaying, by a client, the selected vehicle images in a simulated three-dimensional space on a display, in an arrangement in accordance with similarity of at least one of the photographing date and time information, the photographing place information, and the feature information, wherein, in a case where the vehicle images are displayed in the simulated three-dimensional space, similarity of the vehicle images is determined based on all the photographing date and time information, the photographing place information, and the feature information, and similar vehicle images are arranged close to each other and displaying a standard image selected from the vehicle images in the simulated three-dimensional space so that other vehicle images similar to each other are arranged close to each other and those which have higher similarity to the standard image are placed in a more forward portion by using perspective.

13. The vehicle search method according to claim 12, further comprising:

inputting a narrowing condition regarding at least one of the photographing date and time information, the photographing place information, and the feature information; and re-displaying only vehicle images matched with the narrowing condition input by the condition specifying part among the vehicle images displayed in the simulated three-dimensional space.

14. The vehicle search method according to claim 12, further comprising:

receiving selection with respect to either one of the vehicle images displayed in the simulated three-dimensional space; and rearranging the vehicle images in decreasing order of similarity or in order of time with respect to a standard image, using the selected vehicle image as the standard image.

15. The vehicle search method according to claim 11, wherein the feature information includes at least one selected from a vehicle color and a vehicle shape.

16. A vehicle search system, comprising:
accumulating, in a server, vehicle images photographed by a camera together with at least date and time information and location information of the photographed vehicle images;
extracting, in the server, characteristic information about a vehicle from the photographed vehicle images; and
determining, in a client, similarity of vehicle images based on at least one of the date and time information of the photographed vehicle images, the location information of the photographed vehicle images, and the characteristic information about the vehicle, and displaying, by the client, the vehicle images in a simulated three-dimensional space on a display so that vehicle images similar to each other are arranged close to each other and displaying a standard image selected from the vehicle images in the simulated three-dimensional space so that other vehicle images similar to each other are arranged close to each other and those which have higher similarity to the standard image are placed in a more forward portion by using perspective.

17. The vehicle search system according to claim 16, wherein the vehicle images are photographed by a plurality of cameras in addition to the camera.

* * * * *